(12) United States Patent
Vedaraj et al.

(10) Patent No.: US 11,507,330 B2
(45) Date of Patent: Nov. 22, 2022

(54) SYSTEMS AND METHODS FOR SECURE DELIVERY OF PROCESSED DOCUMENTS USING A DRONE

(71) Applicant: Xerox Corporation, Norwalk, CT (US)

(72) Inventors: Ashok Jason Vedaraj, Tamilnadu (IN); Srinivasarao Bindana, Andhra Pradesh (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/182,496

(22) Filed: Feb. 23, 2021

(65) Prior Publication Data

US 2022/0269452 A1  Aug. 25, 2022

(51) Int. Cl.
| | | |
|---|---|---|
| *G06F 3/12* | (2006.01) | |
| *B64D 9/00* | (2006.01) | |
| *B64F 1/32* | (2006.01) | |
| *B64C 39/02* | (2006.01) | |

(52) U.S. Cl.
CPC .......... *G06F 3/1222* (2013.01); *B64C 39/024* (2013.01); *B64D 9/00* (2013.01); *B64F 1/32* (2013.01); *G06F 3/1238* (2013.01); *G06F 3/1286* (2013.01); *B64C 2201/027* (2013.01); *B64C 2201/128* (2013.01)

(58) Field of Classification Search
None
See application file for complete search history.

(56) References Cited

U.S. PATENT DOCUMENTS

| | | | |
|---|---|---|---|
| 10,552,105 B2 | 2/2020 | Miyazaki et al. | |
| 10,613,803 B2 | 4/2020 | Wushour et al. | |
| 2009/0328159 A1* | 12/2009 | Luo | H04N 1/446 726/4 |
| 2014/0293313 A1* | 10/2014 | Kakapuri | G06F 3/1222 358/1.14 |

(Continued)

FOREIGN PATENT DOCUMENTS

JP    2017087524 A  *  5/2017

OTHER PUBLICATIONS

English translation of Japanese Patent Application 2015-219295, corresponding to Japanese Patent Application Publication 2017-087524. (Year: 2015).*

(Continued)

*Primary Examiner* — Thomas D Lee
(74) *Attorney, Agent, or Firm* — Fox Rothschild LLP (57) ABSTRACT

Systems and methods for secure transfer of printed documents from a print device to a user are disclosed. The systems may include a print device and a drone. The print device may also include an output tray configured to receive documents processed by the print device. The system may receive a print request from the user and determine whether the print request will result in a printed document that should be kept confidential. If printed document that should be kept confidential, the system may generate and transmit a first authentication information to the user. The system may then cause the print device to execute the print request and output the printed document to the output tray. A drone may then transfer the printed document from the print device to the user, and authenticate the user before allowing the user to access the printed document.

69 Claims, 4 Drawing Sheets

(56) References Cited

U.S. PATENT DOCUMENTS

2017/0267347 A1   9/2017   Rinaldi et al.

OTHER PUBLICATIONS

McGowan, M., "The New Factory: Buidling a 'Swarm' of Mobile, Autonomous Robots," University of Arkansas, Research Frontiers, https://researchfrontiers.uark.edu/the-new-factory-building-a-swarm-of-mobile-autonomous-robots/, Feb. 28, 2019.
The Mini Mobile Robotic Printer by ZUtA Labs Ltd.—Kickstarter, https://www.kickstarter.com/projects/1686304142/the-mini-mobile-robotic-printer.
Boissonneault, T., "NYU Tandon Team Developing Mobile 3D Printers that Work as a Team," 3D Printing Media Network, https://www.3dprintingmedia.network/nyu-tandon-autonomous-collaborative-mobile-3d-printers/, Oct. 4, 2019.

* cited by examiner

SYSTEMS AND METHODS FOR SECURE DELIVERY OF PROCESSED DOCUMENTS USING A DRONE

BACKGROUND

Typically, shared networked printers are used by multiple users in a space such as an office. The shared printers are installed in fixed and specific locations of an environment (e.g., an office) and function to output printed documents requested by multiple users. Such printers output printed documents to an output tray attached to the printer. The user who requested the printing needs to go to the location of the printer in order to check whether the printed documents are properly outputted and/or in order to get the printed documents after sending a print command.

Under most circumstances, when a document is submitted for printing, a user may wait for the system to send a message and/or after some predefined time go to the printer location and collect the printed documents from the output tray of the printer. However, when the printed documents include sensitive information, they are visible and/or can be accessed by individuals who do not have access to such sensitive information while the documents are in the output tray of the printer (i.e., before retrieval by the user who requested printing). Therefore, leaving printed documents around the printer for extended periods of time may be against corporate printing security policies and procedures where confidential documents are concerned. Having a secure printer room does not solve this problem because even the people authorized for printer room access may not be entitled to read every confidential document. Ensuring that confidential documents are picked up immediately after they have finished printing requires manual and timely action by the user. For example, the user might go to the printer location immediately after submitting the job, or as soon as a "print complete" notification is issued, and wait until the printing is done. The wait time can vary depending on the queue size, whether the printer is down, whether toner and paper are adequate, etc. This can be annoying, wasteful, and time consuming especially when the output runs to hundreds of pages or there is a system or mechanical problem with the printer. Moreover, certain print areas may not be accessible to a user (e.g., a disabled user).

This document describes new methods and systems directed to solving the issues described above, and/or other problems.

SUMMARY

In one or more scenarios, systems and methods for secure transfer of printed documents from a print device to a user are disclosed. The systems may include a print device and a drone configured to transfer components from the print device to a user. The print device may also include an output tray configured to receive documents processed by the print device. The system may further include a processor and a computer-readable medium containing programming instructions that, when executed by the processor, will cause processor to execute the methods of this disclosure. The system may receive a print request from the user and determine whether the print request will result in a printed document that should be kept confidential. In response to determining that the print request will result in the printed document that should be kept confidential, the system may generate and transmit a first authentication information to the user. The system may then cause the print device to execute the print request and output the printed document to the output tray. A drone may then transfer the printed document from the print device to the user, and authenticate the user before allowing the user to access the printed document.

The drone may either transfer the output tray from the print device to the user and/or the printed document from the output tray.

The system may cause the drone to authenticate the user before allowing the user to access the printed document by transmitting the first authentication information to the drone, prompting the user to provide a second authentication information to the drone, and causing the drone to authenticate the user if the first authentication information matches the second authentication information received from the user. Optionally, the drone may include a locked holding area for holding the printed document during transfer from the print device to the user. In such scenarios, the system may cause the drone to unlock the holding area upon authentication of the user.

In various implementations, the drone may also include a docking structure configured to attach to a landing structure of the print device. The system may cause drone to attach to the landing structure of the print device via the docking structure, and deploy a mechanism to decouple the output tray from the print device or retrieve the printed document from the output tray.

In certain implementations, the system may cause the drone to transfer the printed document from the print device to the user by transmitting a transfer request to the drone that includes a location of the user. Additionally and/or alternatively, the transfer request may include a user identifier, and the drone may use the user identifier to determine a location of the user.

In certain implementations, the system may cause the drone to transfer the printed document from the print device to the user by transmitting a transfer request to the drone that includes instructions to cause the drone to retrieve the printed document from the print device within a threshold time of output of the printed document to the output tray. Additionally and/or alternatively, the transfer request may include instructions to cause the drone to wait for receipt of a message that the user was successfully authenticated before allowing the user to access the printed document.

The first authentication information may include, for example, a passcode, a password, biometric information, a barcode, a QR code, and/or a user identifier.

The system may determine whether the print request will result in the printed document that should be kept confidential based on, for example, user instructions included in the print request, contents of the printed document, and/or an identity of the user.

In response to determining that the print request will result in the printed document that should be kept confidential, the system may, optionally, cause the print device to output the printed document to a secure output tray that is configured to prevent unauthorized access to the printed document.

The drone may include a coupling/decoupling mechanism that is configured to retrieve the printed document from the output tray.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Figure 1:
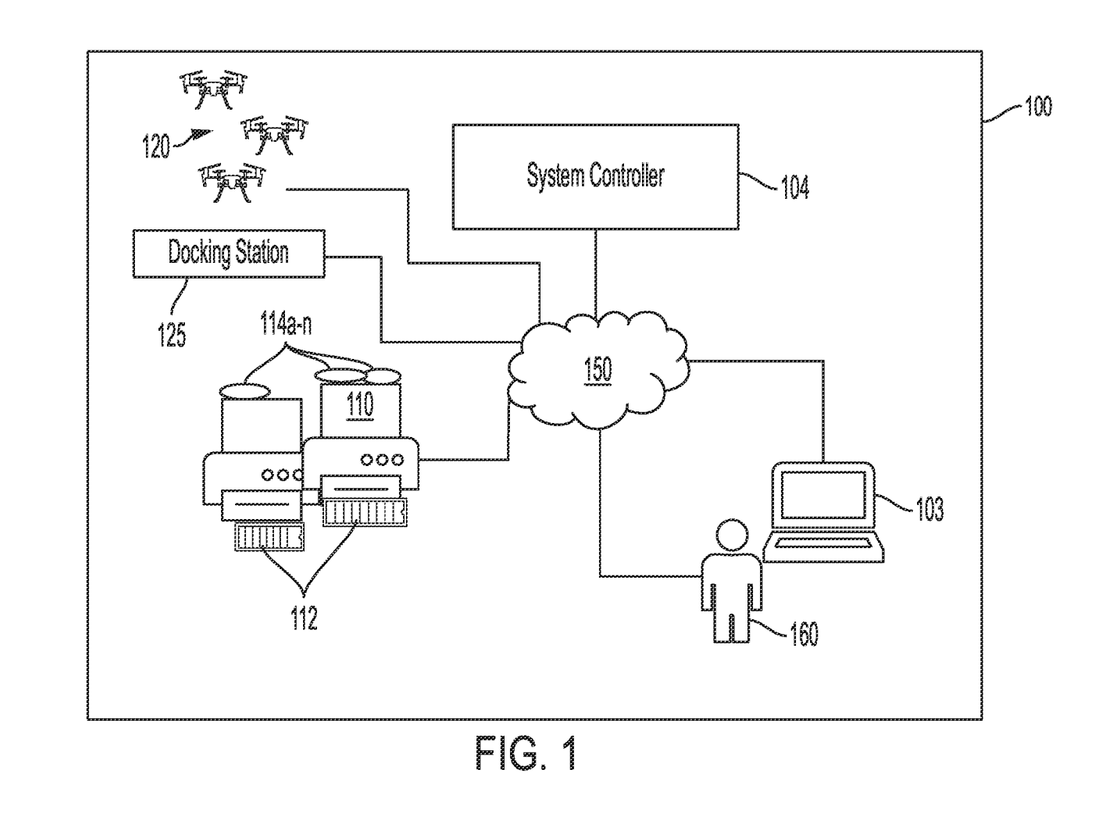
FIG. 1 is a schematic diagram of an example print system for secure delivery of processed documents using drones.

Referring now to FIG. 1, a print system 100 for secure delivery of processed documents using one or more unmanned aerial vehicles (hereinafter a "drone") is illustrated. A drone is an aircraft without a human pilot aboard. Flight plan of the drone is controlled either autonomously by onboard computers or by a pilot using a remote control. The typical launch and recovery method of an unmanned aircraft is by an automatic system or an external operator.

As shown in FIG. 1, the print system 100 includes at least one print device 110, computing device(s) 103, a system controller 104, and at least one drone 120. The print system 100 provides for printing of confidential documents for multiple users connected in a network environment. For illustration purposes, the system 100 is shown as operating with only one print device. However, it should be understood that the system 100 can operate with any number of print devices, each with their own specific document processing functions, and these print devices could be used by multiple different users.

The system 100 may be implemented in a distributed computing environment and interconnected by a communications network 150. The communications network 150 may include connections such as, for example, wired connections, wireless communication links, or fiber optic cables, and may provide any suitable medium of communications such as WiFi, Bluetooth, Ethernet, cellular, intranet, and Internet. Optionally, to enhance system security, communications between the various components of the system can be encrypted using any now or hereafter known encryption methods and systems.

In various implementations, the computing device(s) 103 may be communicatively coupled to the print device 110 (e.g., wirelessly or a wired connection) for submission of document processing jobs by users who are affiliated with the network and thus permitted to print documents. As explained below, a user may provide print jobs through the computing device(s) 103 over the network 150 to the print device 110. In an example, a user may indicate that a print job relates to printing of confidential documents. While non-confidential print jobs may be processed by the print device 110 and delivered to a user by the drone 120, confidential print jobs may be securely stored and delivered to the user (as described below). The following description details the process of printing and providing printed documents pertaining to confidential print jobs.

In certain implementations, the print device 110 may include and/or be coupled to an output tray(s) 112 that is configured to collect documents processed (e.g., printed) by the print device 110. In some embodiments, the output tray may be a secure output tray that includes an electronic locking mechanism, and may be locked by default. Users who print to one of the secure output tray 112 may be prompted to enter authenticating information (e.g., a passcode, a password, user-id, etc.) in order to unlock the output trays and gain access to the printed documents. The output tray 112 may include a user interface (e.g., touchpad, keypad, voice recognition interface, etc.) to allow users to enter authentication information to unlock the secure output tray. Optionally, a biometric identification device (e.g., fingerprint scanner, retinal scanner, etc.) may be used to receive biometric identification information from users for unlocking the secure output tray to identify users. In some implementations, the print device 110 may be associated with a plurality of secure output trays with different security levels.

Optionally, the output tray 112 may be configured to communicate with one or more components of the print system 100 such as the drone 120 (e.g., wired and/or wirelessly) to receive authentication information. In such embodiments, a user and/or the system may transmit the authentication information to the drone 120, and the drone 120 may use the received authentication information to access printed documents held within the secured output tray. The drone may then transfer the printed documents held within the secured output tray to the user (instead of transferring the output tray).

Additionally and/or alternatively, the output tray 112 may not be a secure output tray and the drone 120 that is configured to transfer the printed documents/output tray may only allow a user access to the output tray/printed documents upon successful authentication of a user (as described below). In some embodiments, a locking mechanism may also be included in a holding area of the drone that is configured to hold the printed documents/output tray during transfer.

In some implementations, the output tray 112 may be coupled to the print device 110 using a mechanism that allows the drone 120 to decouple the output tray 112 from the print device 110. For example, the output tray 112 may be coupled to the print device 110 using tethers, magnetic coupler, hooks, spring loaded clamps, a latching structure that may be operated drone, a friction based mounting structure, screw or threaded components, removable adhesives, or the like. Alternatively and/or additionally, the output tray 112 may be coupled to the print device 110 using a mechanism that may be activated to detach the output tray from the print device upon, for example, a signal from the drone, landing of the drone at a landing structure of the print device, identification of a drone in the vicinity of the drone, or the like. For example, the mechanism may be a spring loaded clamp that may be mechanically coupled to the landing structure such that landing of a drone on the landing structure may cause the spring loaded clamp to detach the output tray automatically.

Additionally and/or alternatively, the drone may not transfer the output tray and may only transfer the printed documents from the output tray to the user. In such embodiments, the output tray may include an opening and/or latching mechanism that is operable by the drone to retrieve documents held within the output tray. In yet another embodiment, the output tray may be open (or unsecure) and the drone may retrieve the printed documents from the output tray immediately (and/or within a threshold time) in order to minimize the likelihood of unauthorized access to printed documents while in an unsecure output tray.

In certain embodiments, the print device 110 may further include one or more drone landing structures 114a-n. It should be noted that while FIG. 1 illustrates the print device 110 as including the landing structures 114a-n some or all of the landing structures may be included in other parts of the system 100 (e.g., on the output tray 112). Furthermore, two or more print devices may share one or more of the drone landing structures. Herein, a landing structure refers to structures, features, assemblies, etc. that allow a drone to come to rest for the purpose of coupling and/or decoupling an output tray from a print device. A landing structure may include one or more components configured to receive and/or engage complementary components of a drone, and may assist in securing the drone to the print device 110. Examples of landing structures may include, without limitation, slots, brackets, wedges, tethers, channels, grooves, recesses, latches, magnetic components configured to exert an electromagnetic field, hooks, or the like, configured to stabilize the drone, for example, by engaging complementary components of a drone. In an embodiment, one or more of the landing structures may only be deployed when a drone is approaching, and may be withdrawn in a receiving area of the print device 110 when the landing structure is not deployed.

Docking at a landing structure allows the drone to rest from flight, thereby conserving energy while it performs output tray coupling and/or decoupling operations. In addition, docking at a landing structure allows the drone to have a stable and/or rigid base to facilitate the forces required to retrieve and/or couple the output tray (to and/or from the print device) as well as maintain relatively tight tolerances generally desirable during such operations. Docking at a landing structure may also allow the drone to connect to a power source where the drone may charge and/or utilize power directly from a print device. For example, while connected to a landing structure, the drone may connect to the print device power supply to provide power directly to a coupling/decoupling mechanism to move, manipulate, and/or transfer the output tray to and/or from the drone. The power connection may also provide a communication link between the drone and the print device, by modulating, for example, the power bus with a communication signal. Alternatively, and/or additionally, the drone may connect to a dedicated communication bus when it is docked at a landing structure. Alternatively, and/or additionally, the drones may use wireless communication to communicate with the print device, system controller, and/or with each other as discussed below in more detail.

Optionally, a drone may perform various operations without landing—i.e., while hovering over an output tray.

In an embodiment, a locating device (not shown here) may assist and facilitate with accurately guiding and docking a drone to one or more of the landing structures. For example, the locating devices may include an optical feature such as a visible landing target, sensors (e.g., pressure sensors), laser scanners, video cameras, or the like to guide the drone to a precise location during a landing, and a drone may use a complementary sensor and/or feature to more precisely guide the landing and/or positioning of the drone. The locating devices may include optical locating devices, radio locating devices or a combination thereof. In some embodiments, the locating devices may be emitters only, or may be a combination of shapes, emitters, receivers, transmitters, transceivers, and sensors. For example, the drone may obtain position and ranging information from the locating devices which may inform the drone of its proximity with a landing structure, a rate of descent, a relative position with respect to the landing structure, or other information.

The drone 120 may be configured to transfer components (e.g., output trays, printed documents, etc.) to and/or from the print device 110 and users 160 in the print system 100.

The drone 120 may be capable of movement in the x-, y-, and z-coordinate directions and capable of transporting components (e.g., output trays, printed documents, etc.) within the print system 100. In an embodiment, the drone 120 is configured to have a size and structure that enables them to handle and/or apply the forces required to transfer, retrieve and/or mount an output tray and/or documents from a print device. Any number of drones may be added to, or removed from, print system 100 as required to support such operations. While the drones are described and depicted as transferring output trays and/or documents in the print system 100, it will be appreciated that the drones may be adapted and configured for transferring other components in addition to or as an alternative to output trays and documents.

The system controller 104 may be configured to analyze information received from the print device 110, a user 160, and/or other print system 100 components to, for example, determine whether an output tray and/or documents need to be transferred from a print device to a user, a time of transfer, identify a drone available to perform the transfer, determine a flight plan for the drone, transmit suitable instructions to the drone, or perform other suitable functions. The system controller 104 may also transmit authentication information (e.g., passcode) to a user for use in unlocking a secure tray and/or gaining access to an output tray/printed documents held by a drone. For example, upon receiving a print job, the system controller 104 may associate authentication information with the print job. The authentication information may be, for instance, a biometric identifier, a pin, a password, a barcode, a QR code, a smart card code, or the like. The authentication information may be dynamically generated by the system controller 104 and/or the user may be requested to provide the authentication information, such as a password. The authentication information corresponding to each print job may be stored in the print job data. The print job data may also include user information, such user ID corresponding to each print job. In one example, once the confidential documents are printed, a notification may be provided to drone to collect the printed confidential documents and transfer them to the associated user, along with the authentication information that the drone may use to authenticate the user before allowing the user to access the transferred documents/output tray. Specifically, to maintain confidentiality of the printed confidential documents in the output tray, a user may be authenticated prior to providing access to the protected confidential documents from the output tray to a drone and/or from a drone to a user. The authentication of the user may be based on the authentication information associated with the print job.

In certain embodiments, a print device controller and/or a drone control unit may perform some or all of the functions of a system controller.

The print system 100 may also include one or more drone docking stations 125 to which a drone may selectively land on or attach to (dock) and take-off or detach (undock), when not in use for transfer operations in the print system 100. In one embodiment, a docking station 125 may be configured to, for example, stabilize the drone, enable a drone to recharge/refuel, provide an electrical coupling between the drone and the system controller 104, reset navigation systems, await further instructions, or a combination thereof. In an embodiment, the placement and layout of the docking station(s) 125 in the print system 100 may be configured such that one or more of the print device(s) 110 and/or users 160, are accessible by a drone associated with a docking station(s). Optionally, a docking station may be associated with a print device.

In an embodiment, the drone 120 may take on many different configurations and may include any type of transport configuration and/or arrangement configured to fly. A drone may include a flight assembly which may include one or more or any combination of propellers, rotors, blades, etc. ("flight assembly") that generate a lifting force sufficient to lift the drone (including the drone structure, motors, electronics, and power source) and any loads (e.g., light modules) that may be attached to the drone. The flight assembly may also provide a horizontal propulsion force so that the drone may move in any of the x-, y-, and z-coordinate directions and may move in any desired direction, and/or by any desired route. The flight assembly, including any motors, actuators, propellers, rotors, and/or propulsion assemblies, may be powered by a power source, such as an energy storage system like a battery and/or a super capacitor. The flight assembly may be vertically and/or horizontally mounted depending on the flight mode of the drone.

One flight assembly may include a plurality of electric motors powering a plurality of propellers or rotors. Each propeller may be associated with and/or connected to an electric motor. Several motors (e.g., servo motors) may act to move the motor/propeller assembly to provide the correct amount of angular rotation to provide desired vertical lift and horizontal propulsion. A common drone configuration suitable for use in the various embodiments is a "quad-copter" configuration. In an example of a quad-copter configuration, typically four horizontally configured rotary lift propellers and motors are fixed to a frame. Drones configured with more or less propellers and/or motors are also contemplated. A quad-copter style horizontal rotary drone may fly in any unobstructed horizontal and vertical direction or may hover in one place. In the examples described herein, a quad-copter drone configuration is used for illustrative purposes, however, other drone designs are contemplated and may be used.

Figure 2:
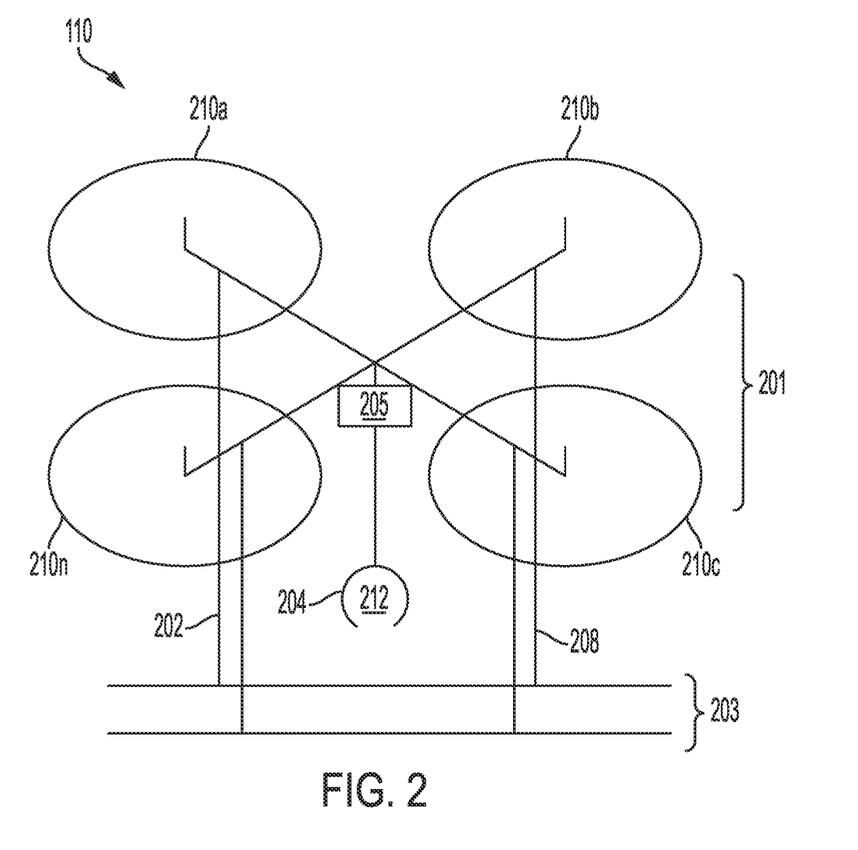
FIG. 2 is a schematic illustration of an example drone.

Referring now to FIG. 2, a schematic representation of an example drone 120 for performing the transfer operations in a print system is illustrated. The drone 120 may include a flight assembly 201, a frame 202, docking structures 203, a component coupling/decoupling mechanism 204, a component holding structure 205, a power source (not shown here), and a control unit 208.

The flight assembly 201 may include rotors 210a, 210b, 210c . . . 210n, and one or more associated motors (not shown here). For ease of description and illustration, some detailed aspects of the drone 110 are omitted such as wiring, skin or shell, frame structure interconnects or other features that would be known to one of skill in the art. In an embodiment, the frame 202 may provide structural support for the flight assembly 201, docking structures 203, a component coupling/decoupling mechanism 204, a holding structure 205, etc., and is configured to be sufficiently strong to support the maximum load weight for the combination of the components of the drone and the drone's expected load (e.g., output tray, printed documents, etc.).

In various implementations, the coupling/decoupling mechanism 204 of a drone 110 may include one or more structures (e.g., a gripper assembly, a rod with a vacuum cup, hook, latch, tether etc.) configured for applying a suitable force to retrieve and/or mount components such as output trays to, for example, a print device and/or to retrieve print documents from output trays. In an embodiment, the size and configuration of the coupling/decoupling mechanism 204 may be extendible or adjustable in order to provide adequate access to an output tray during a mounting and/or retrieval operation, from a landing structure. The coupling/decoupling mechanism 204 may also be configured to securely attach to an output tray and/or print documents during transfer and/or a mounting operation (e.g., before mounting and/or after retrieval). The coupling/decoupling mechanism 204 may further be configured to open an output tray to access documents stored within.

Additionally, and/or alternatively, an area enclosed by the frame and landing gear, and underneath the flight assemblies or propulsion units (e.g., a holding structure 205), may be provided to retain components such as output trays and/or documents during transfer. In an example embodiment, the holding structure 205 of a drone may include a component retaining mechanism that may be operated to release and/or hold output tray/documents. In some embodiments, the holding structure 205 may be a secure holding structure 205 that includes an electronic locking mechanism, and may be locked to prevent unauthorized access to the output tray/documents held within. Users may be prompted to enter authenticating information (e.g., a passcode, a password, user-id, etc.) in order to unlock the holding structure 205 and gain access to the components within (e.g., output tray, printed documents, etc.). The holding structure 205 (or another part of the drone 110) may include a user interface (e.g., touchpad, keypad, voice recognition interface, etc.) to allow users to enter authentication information to unlock the secure holding structure 205. Optionally, a biometric identification device (e.g., fingerprint scanner, retinal scanner, etc.) may be used to receive biometric identification information from users for unlocking the holding structure 205.

Optionally, a drone may also include a scanner module 212 shown schematically in configured to receive identification and/or other information (e.g., by scanning identifying barcodes) from a user device (e.g., a mobile device of a user), a user identification card, or the like. Examples of a scanner module may include, without limitation, RFID scanner, a smart card reader, quick response codes scanner, bar code scanners, laser scanners, electrical/optical equipment with recognition software, infrared scanners, radar, sonar, chemical sensors, or an audio/visual device with recognition software. Such scanner modules are known in the art to identify users by, for example, attaching, spatial and identification information such as information encoded in RFID tags, barcode, etc. on a user device, user identification card, or the like. In an embodiment, the scanner module 212 may be included in the coupling/decoupling mechanism 203.

In an embodiment, a docking structure 203 may be configured to assist the drone 350 in attaching to, engaging, and/or being associated with a complementary landing structure of a print device and/or a docking station. Examples of the docking structure 203 may include, without limitation, docking pins, skids, slides, sledges, tethers, airframes, wheels, latches, grooves, recesses, channels, pins, or the like. In an embodiment, the docking structures 203 may also include landing sensors such as, for example and without limitation, optical sensors, radio sensors, proximity sensors, magnetic sensors, camera sensors, acceleration sensors, or other sensors. Alternatively, and/or additionally, the landing sensors may be contact or pressure sensors that may provide a signal that indicates when the drone has made contact with a surface such as a docking station. In some embodiments, the docking structure 203 may also be configured to include a coupling interface to provide the ability to charge a drone power source (e.g., battery) when the drone is docked on and/or associated with a docking station or mounting structure of a print device, such as through charging connectors or power lines. The coupling interface may also provide direct power to the drone (e.g., the coupling/decoupling mechanism) when the drone is docked at the landing structure(s) of a print device.

The drone 110 may further include a control unit 208 that may house various circuits and devices used to power and control the operation of the drone. In an embodiment, the control unit 208 of a drone may be configured with processing and communication devices that enable the drone to, for example, determine a flight plan, navigate (such as by controlling the flight motors to achieve flight directionality), and receive position information and other information from other system components. Position information may include the current drone position and/or positional information obtained relating to a print device, user, or docking station, etc. The control unit (and/or the drone) may include a communications interface.

In an embodiment, a drone may also include various sensors, for example vision systems, proximity sensors, light detection and ranging ("LIDAR") sensors, etc. for detecting obstructions, navigation, communication with other devices, or the like. In an embodiment, when a drone is following a flight plan, it may utilize various sensors to detect local obstacles and avoid collision and then return to the flight plan. For example, the drone may have a vision system to see obstacles or laser and/or sonic range finders to determine a distance to obstacles. For example, a drone may have a laser-based scanning system that detects objects (such as other drones in the data storage system) and their distance and velocity so the drone may determine a path to avoid such obstacles.

In an embodiment, a drone may utilize fine-grain communication, for example using multilateration or triangulation of short range wireless transmitters, magnetometers, laser guides or LIDAR technologies, radar guidance, ultrasonic sensors, global positioning systems (GPS), global navigation satellite system (GNSS), or any other devices configured to provide relative or global positioning feedback such that the drone can approach, land on, dock, or become associated with a print device or docking station. Alternatively, and/or in addition, the drone may be equipped to navigate by receiving beacon signals, radio frequency identification (RFID) signals, position references, or other signals from radio nodes, such as WiFi access points. Furthermore, the drone may have a sensor to measure altitude (e.g., a pressure sensor). A drone may utilize any now or hereafter known sensors, guidance, and/or positioning systems.

It will be appreciated that the system and method may include one or more drones that are used to transfer components in the print system. For example, a drone may remain docked at the docking station and/or print device until it receives a new instruction to perform an operation. Docking the drones when not actively performing an operation may also prevent collisions by reducing the air traffic. In an embodiment, the drones may be docked at optimal positions computed based at least in part on the physical distribution of the print devices and/or users in the print system 100, physical distribution of the docking stations in the print system 100, positions of and the number of drones in the print system 100 (such as by minimizing the overall travel time for a docked drone to any print device and/or user in the print system). In one example, there could be one drone associated with each print device. This may significantly improve the performance and throughput of the system.

Referring back to FIG. 1, the print system 100 may also include one or more data stores 170 for storing information such as flight path generation rules for a drone, print device information (e.g., location of one or more output trays, device identification of print devices, size/configuration of output trays, etc.), information about the drones (e.g., last docking location, previous operations, number of drones, etc.), information about the environment of the print device (e.g., location of print device(s), locations of user(s), location of drone docking stations, etc.), or the like.

Figure 3:
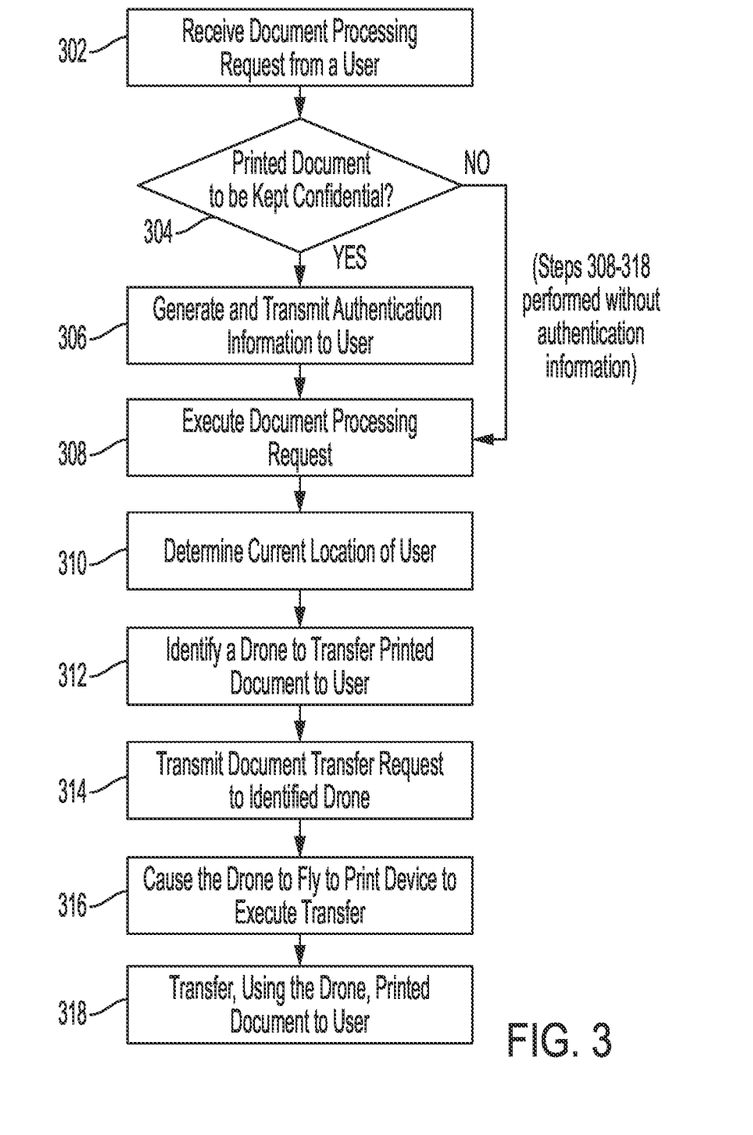
FIG. 3 illustrates a flowchart of an example method for secure delivery of processed documents using drones.

FIG. 3 is a flowchart illustrating and describing an example method of transferring components in a print system using drones. While the method is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 3, but the process may be integrated and/or one or more steps may be performed together, or the steps may be performed in the order disclosed or in an alternate order.

At 302, the system may receive a document processing request from a user (e.g., via a user's computing device). The document processing request may also include user information corresponding to the user that submits the request. Examples of user information may include, without limitation, login information (e.g., username, password), user email, user identification, device identifier corresponding to a device from which the initiation request is received where the device is associated with a particular user (e.g., MAC address, IP address, device name, certificate, or the like), network information associated with the user's device, user location, or the like.

At 304, the system may determine whether the document processing request will result in an output document that should be kept confidential. The system may make the determination based on, for example, a confidential designation included in the received request, information relating to the user (for e.g., document processing requests submitted by certain users, such as HR personnel, may always result in confidential output documents), contents of the document processing request (e.g., identification of keywords such as confidential, SSN, financial, etc. using Optical Character Recognition (OCR) or other methods), or the like.

If the system determines that the document processing request will result in an output document that should be kept confidential (304: YES), the system may generate authentication information and transmit the authentication information to the user requesting the document processing job (306). Optionally, the system may receive the authentication information from a user and use it to lock a secure output tray and/or provide it to a drone (discussed below). Examples of authentication information may include, without limitation, passcodes, passwords, barcodes, biometric information, or the like.

At 308, the system may execute the document processing job, and output an output document (e.g., printed documents) to an output tray. Optionally, when the system includes secure output trays, the system may return the printed documents to a secure output tray upon determining that the printed documents should be kept confidential. The secured output tray may be locked to prevent unauthorized access using, for example, universal (i.e., common to all print jobs) authentication information and/or print job specific authentication information (e.g., authentication information generated in 506). However, upon determining that the printed documents should not be kept confidential, the system may return the printed documents to any output tray of the print system.

The system may then determine a current location of the user who submitted the document processing job (310). The system may determine the location from the received user instructions, from a user device associated with the user (e.g., using GPS triangulation and/or other now or hereafter known location determining methods), location of the computing device, or the like.

At 312, the system may identify a drone to transfer the printed documents/output tray to the user. In certain embodiments, the system may optimize the movement of drones within the print system by choosing a drone which minimizes the time and/or resources required to perform the operation based on, for example, distance of a drone from the print device, distance of the drone from the user, position of other drones within the print system, current status of the drone (e.g., performing a transfer operation), status of other requests to perform an operation, vacancy or availability of a docking station on the print device, availability of a drone, or the like. For example, the system may identify the drone which is closest to the print device and available to perform an operation. As discussed below, drones not engaged in operation may be configured to be docked at a docking station.

At 314, the system may transmit a document transfer request and the location information of the user to the identified drone. The system may also send additional information to the drone such as, for example and without limitation, print device information, position of landing structures on the print device, position of the output tray that holds the documents to be transferred, information relating to whether or not the printed documents should be kept confidential, or the like. The drone may communicate and receive instructions and data wirelessly and/or through a wired connection, for example, while it is docked at a docking station. In some examples (e.g., when the output tray is not secure), the system may include in the request a time when the printed documents will be output into the output tray such that the drone may retrieve the printed documents from the output tray immediately (and/or within a threshold time) in order to minimize the likelihood of unauthorized access to printed documents while in an unsecure output tray. Optionally, the system may cause the print device to output the printed document only when the drone is in the vicinity (e.g., within a threshold distance) of the print device. For example, the drone may transmit a signal to the print device to output the printed document when it is in the vicinity of the print device.

If the drone is configured to transfer the printed documents (and not the output tray) to the user, the system may also transmit authentication information generated in 306 to the drone. Optionally, if the printed documents are returned to a secured output tray, the system may also transmit, to the drone, information required for opening the secured output tray (if different from the authentication information of 306).

At 316, the identified drone may fly to the print device, associate with (e.g., attaches to) the print device landing structure(s) (and/or hover in place), and may perform the requested operation. For example, the drone may use its coupling/decoupling mechanism to apply of suitable pressure or force to either decouple the output tray from the print device (if transferring the output tray) and/or open the output tray to retrieve the printed documents held within the output tray. In an embodiment, if the operation involves retrieval of the printed documents from a secure output tray, the drone may also appropriately provide the received authentication information or other information to open the secure output tray. For example, the drone may transmit a signal to the print device/secure output tray including the information required to open the secure output tray, perform mechanical operations to punch a passcode on a keypad or touchpad of the secure output tray, or the like. The print device/secure output tray may only be opened when the information provided by the drone (e.g., a passcode) matches the information stored in a memory of the print device/secure output tray.

The drone may then transfer (318) the output tray/printed documents to the user at the received location. Optionally, the drone may determine the user's location (instead of receiving the location from the system) based on a received user identification and using any now or hereafter known indoor location determining techniques (e.g., GPS triangulation, Bluetooth signal strengths, etc.)

If the printed documents are to be kept confidential, the drone may only allow the user to access the output tray/printed documents after authenticating the user. For example, the drone may hold the output tray/printed documents in a locked or secure holding area during transfer and prompt the user to provide authentication information (previously received from the system) before granting access to the holding area. The holding area may only be opened when the authentication information provided by the user (e.g., a passcode) matches the authentication information received by the drone from the system (for example, with the transfer request). In another examples, the authentication information in include a barcode, a QR code, or the like generated by the system and transmitted to a user's device. The drone may scan the user's device (e.g., using a scanner) and determine whether the authentication information is associated with the user who submitted the document processing request. In some other examples, the drone may use biometric information to authenticate the user who submitted the document processing request.

Optionally, the drone and/or the user may transmit the authentication information to the system, and the system may perform the matching. The drone may only allow a user to access the holding area upon receipt of a message from the system that the user was appropriately authenticated as the user who submitted the document processing request.

Additionally and/or alternatively, if the drone transferred a secure holding tray to the user, the user may need to provide further authentication information (e.g., a passcode) to the system for opening the secure output tray.

If the printed documents are not to be kept confidential, the drone may allow the user to access the output tray/printed documents without the authentication steps discussed above.

In various implementations, the drone may proceed along a programmed and/or predetermined route from its current location to the print device and/or from the print device to the user. Alternatively, and/or additionally, the drone may determine its own route based on various factors, such as altitude, distance to the print device, distance to the user, obstacles (e.g., other flying drones, print devices, personnel, etc.), battery life of the drone, retrievability considerations, previous routes, or the like. In an embodiment, if another drone is already attached to the landing structure(s) of the print device, the system may also instruct that drone to vacate the landing structure(s), in order to avoid collision. While the embodiments described herein describe a drone as attaching to landing structures of a print device before performing an operation, it is to be understood that a drone may perform an operation without such an attachment, for example, while hovering close to a print device/output tray.

If the system determines that the document processing request will not result in an output document that should be kept confidential (304: NO), the system may proceed to step 308 (and, optionally, perform various steps 308-318 without the additional security steps required for authenticating the user).

Figure 4:
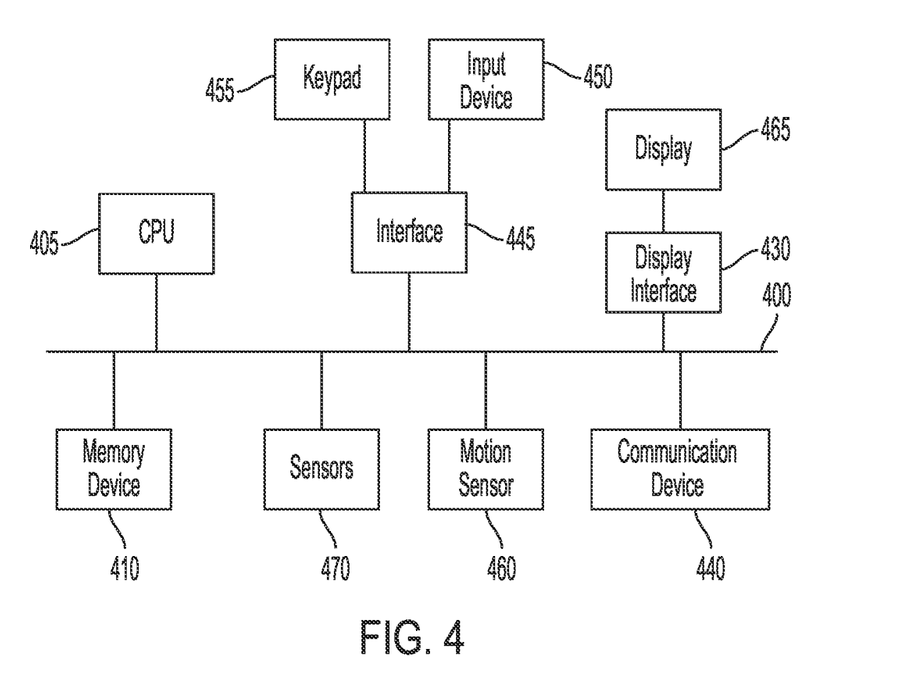
FIG. 4 illustrates an example of internal hardware that may be used to contain or implement the various computer processes and systems, according to an embodiment.

FIG. 4 depicts a block diagram of hardware that may be used to contain or implement program instructions, such as those of a cloud-based server, electronic device, virtual machine, or container. Some or all of the components of FIG. 4 may be included in a print device or a drone described above. A bus 400 serves as an information highway interconnecting the other illustrated components of the hardware. The bus may be a physical connection between elements of the system, or a wired or wireless communication system via which various elements of the system share data. Processor 405 is a processing device of the, performing calculations and logic operations required to execute a program. Processor 405, alone or in conjunction with one or more of the other elements disclosed in FIG. 4, is an example of a processing device, computing device or processor as such terms are used within this disclosure. The processing device may be a physical processing device, a virtual device contained within another processing device, or a container included within a processing device.

A memory device 410 is a hardware element or segment of a hardware element on which programming instructions, data, or both may be stored. Read only memory (ROM) and random access memory (RAM) constitute examples of memory devices, along with cloud storage services.

An optional display interface 430 may permit information to be displayed on the display 445 in audio, visual, graphic or alphanumeric format. Communication with external devices, such as a printing device, may occur using various communication devices 440, such as a communication port or antenna. A communication device 440 may be communicatively connected to a communication network, such as the Internet or an intranet.

The hardware may also include a user input interface 445 which allows for receipt of data from input devices 450 such as a keyboard or keypad 455, a mouse, a touch pad, a touch screen, a remote control, a pointing device, a video input device and/or a microphone. Data also may be received from an image capturing device 420 such as a digital camera or video camera.

Various sensors such as a positional sensor and/or motion sensor 470 and associated programming may be included to detect position and movement of the Motion device. Examples of motion sensors include gyroscopes or accelerometers. Examples of positional sensors such as a global positioning system (GPS) sensor device that receives positional data from an external GPS network. Other types of sensors 440 (e.g., vibration sensors) may also be included.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, laptop computers, digital display devices, print devices, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, print output trays, connected light bulbs and other devices. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 4.

A "document" refers to a digital representation of a document such as a word processor file, an electronic presentation file, an electronic spreadsheet, a PDF file, or a bitmap file (e.g. TIFF, JPG, PNG files etc.) that is stored in a computer readable memory or a storage medium. A document file may be an electronic representation of a physical document that contains one or multiple pages. A document may also refer to the set of instructions or metadata that cause the document to be processed.

A "document processing service" or "document processing job" refers to a service that can modify or otherwise process a document, for example, by performing print-related services, document repository services, scanning services, document management services, image processing services and/or the like.

The term "print device" refers to a machine having hardware capable of reading a digital document file and use the information from the file and associated print instructions to print of a physical document on a substrate. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. In some embodiments, a print device may have additional capabilities such as scanning or faxing and thus may be a multifunction device ("MFD").

The term "print job" refers to a set of digital data that represents text, images and/or other content that a print device will print on a substrate The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

A "controller device", "controller", or "control unit" is an electronic device that is configured to execute commands to control one or more other devices or device components, such as a print device, output tray, components of a drone, etc. A "controller card" or "control card" or "control module" refers to a circuit component that acts as the interface between an input interface (such as an input interface of a controller device) and a device such as a drone.

The features and functions described above, as well as alternatives, may be combined into many other systems or applications. Various presently unforeseen or unanticipated alternatives, modifications, variations or improvements may be made by those skilled in the art, each of which is also intended to be encompassed by the disclosed embodiments.

The invention claimed is:

1. A print system for secure transfer of printed documents from a print
device to a user, the print system comprising:
a print device comprising an output tray configured to receive documents processed by the print device;
a drone configured to transfer components from the print device to a user;
a processor; and
a computer-readable medium containing programming instructions that, when executed by the processor, will cause processor to:
receive a print request from the user,
determine whether the print request will result in a printed document that should be kept confidential,
in response to determining that the print request will result in the printed document that should be kept confidential, generate and transmit a first authentication information to the user,
cause the print device to execute the print request and output the printed document to the output tray, and
cause the drone to:
transfer the output tray comprising the printed document from the print device to the user, and
authenticate the user before allowing the user to access the printed document.

2. The print system of claim 1, wherein the programming instructions to cause the drone to authenticate the user before allowing the user to access the printed document comprise programming instructions that are configured to, when executed by the processor, cause the processor to:
transmit the first authentication information to the drone;
prompt the user to provide a second authentication information to the drone; and
cause the drone to authenticate the user if the first authentication information matches the second authentication information received from the user.

3. The print system of claim 2, wherein the drone further comprises a locked holding area for holding the printed document during transfer from the print device to the user.

4. The print system of claim 3, wherein the programming instructions to cause the drone to authenticate the user before allowing the user to access the printed document comprise programming instructions that are configured to, when executed by the processor, cause the drone to unlock the holding area upon authentication of the user.

5. The print system of claim 1, wherein the drone comprises a docking structure configured to attach to a landing structure of the print device.

6. The print system of claim 5, wherein the programming instructions to cause the drone to transfer the printed document from the print device to the user comprise programming instructions that are configured to, when executed by the processor, cause the drone to:
attach, via the docking structure, to the landing structure of the print device; and
deploy a mechanism to decouple the output tray from the print device or retrieve the printed document from the output tray.

7. The print system of claim 1, wherein the programming instructions to cause the drone to transfer the printed document from the print device to the user comprise programming instructions that are configured to, when executed by the processor, cause the processor to transmit a transfer request to the drone, the transfer request including a location of the user.

8. The print system of claim 1, wherein the programming instructions to cause the drone to transfer the printed document from the print device to the user comprise instructions that are configured to, when executed by the processor, cause the processor to:
transmit a transfer request to the drone, the transfer request including a user identifier, and
cause the drone to determine, using the user identifier, a location of the user.

9. The print system of claim 1, wherein the programming instructions to cause the drone to transfer the printed document from the print device to the user comprise programming instructions that are configured to, when executed by the processor, cause the processor to transmit a transfer request to the drone, the transfer request comprising instructions to cause the drone to retrieve the printed document from the print device within a threshold time of output of the printed document to the output tray.

10. The print system of claim 1, wherein the programming instructions to cause the drone to authenticate the user before allowing the user to access the printed document comprise programming instructions that are configured to, when executed by the processor, cause the drone to wait for receipt of a message that the user was successfully authenticated before allowing the user to access the printed document.

11. The print system of claim 1, wherein the first authentication information comprises at least one of the following: a passcode, a password, biometric information, a barcode, a QR code, or a user identifier.

12. The print system of claim 1, wherein the programming instructions that, when executed by the processor, will cause processor to determine whether the print request will result in the printed document that should be kept confidential comprise programming instructions to cause to processor make the determination based on at least one of the following: user instructions included in the print request, contents of the printed document, or an identity of the user.

13. The print system of claim 1, further comprising programming instructions that, when executed by the processor, will cause processor to, in response to determining that the print request will result in the printed document that should be kept confidential, cause the print device to output the printed document to a secure output tray that is configured to prevent unauthorized access to the printed document.

14. The print system of claim 1, wherein the drone comprises a coupling/decoupling mechanism that is configured to retrieve the printed document from the output tray.

15. A method for secure transfer of printed documents from a print device to a user, the method comprising, by a processor:
   receiving a print request from the user,
   determining whether the print request will result in a printed document that should be kept confidential,
   in response to determining that the print request will result in the printed document that should be kept confidential, generating and transmitting a first authentication information to the user,
   causing the print device to execute the print request and output the printed document to an output tray, and
   causing a drone to:
      transfer the output tray comprising the printed document from the print device to the user, and
      authenticate the user before allowing the user to access the printed document.

16. The method of claim 15, wherein causing the drone to authenticate the user before allowing the user to access the printed document comprises:
   transmitting the first authentication information to the drone;
   prompting the user to provide a second authentication information to the drone; and
   causing the drone to authenticate the user if the first authentication information matches the second authentication information received from the user.

17. The method of claim 16, wherein causing the drone to authenticate the user before allowing the user to access the printed document comprises causing the drone to unlock a holding area configured to hold the print document upon authentication of the user.

18. The method of claim 15, wherein causing the drone to transfer the printed document from the print device to the user comprises causing the drone to:
   attach, via a docking structure, to a landing structure of the print device; and
   deploy a mechanism to decouple the output tray from the print device or retrieve the printed document from the output tray.

19. The method of claim 15, wherein causing the drone to transfer the printed document from the print device to the user comprises transmitting a transfer request to the drone, the transfer request including a location of the user.

20. The method of claim 15, wherein causing the drone to transfer the printed document from the print device to the user comprises:
   transmitting a transfer request to the drone, the transfer request including a user identifier, and
   causing the drone to determine, using the user identifier, a location of the user.

21. The method of claim 15, wherein causing the drone to transfer the printed document from the print device to the user comprises transmitting a transfer request to the drone, the transfer request comprising instructions to cause the drone to retrieve the printed document from the print device within a threshold time of output of the printed document to the output tray.

22. The method of claim 15, wherein causing the drone to authenticate the user before allowing the user to access the printed document comprises causing the drone to wait for receipt of a message that the user was successfully authenticated before allowing the user to access the printed document.

23. The method of claim 15, wherein the first authentication information comprises at least one of the following: a passcode, a password, biometric information, a barcode, a QR code, or a user identifier.

24. The method of claim 15, wherein determining whether the print request will result in the printed document that should be kept confidential comprises making the determination based on at least one of the following: user instructions included in the print request, contents of the printed document, or an identity of the user.

25. The method of claim 15, further comprising, in response to determining that the print request will result in the printed document that should be kept confidential, causing the print device to output the printed document to a secure output tray that is configured to prevent unauthorized access to the printed document.

26. A print system for secure transfer of printed documents from a print device to a user, the print system comprising:
   a print device comprising an output tray configured to receive documents processed by the print device;
   a drone configured to transfer components from the print device to a user;
   a processor; and
   a computer-readable medium containing programming instructions that, when executed by the processor, will cause processor to:
      receive a print request from the user,
      determine whether the print request will result in a printed document that should be kept confidential,
      in response to determining that the print request will result in the printed document that should be kept confidential, generate and transmit a first authentication information to the user,
      cause the print device to execute the print request and output the printed document to the output tray,
      transmit a transfer request to the drone, the transfer request including a user identifier, and
      cause the drone to:
         determine, using the user identifier, a location of the user,
         transfer the printed document from the print device to the user, and
         authenticate the user before allowing the user to access the printed document.

27. The print system of claim 26, wherein the programming instructions to cause the drone to authenticate the user before allowing the user to access the printed document comprise programming instructions that are configured to, when executed by the processor, cause the processor to:
   transmit the first authentication information to the drone;
   prompt the user to provide a second authentication information to the drone; and
   cause the drone to authenticate the user if the first authentication information matches the second authentication information received from the user.

28. The print system of claim 27, wherein the drone further comprises a locked holding area for holding the printed document during transfer from the print device to the user.

29. The print system of claim 28, wherein the programming instructions to cause the drone to authenticate the user before allowing the user to access the printed document comprise programming instructions that are configured to, when executed by the processor, cause the drone to unlock the holding area upon authentication of the user.

30. The print system of claim 26, wherein the drone comprises a docking structure configured to attach to a landing structure of the print device.

31. The print system of claim 30, wherein the programming instructions to cause the drone to transfer the printed document from the print device to the user comprise programming instructions that are configured to, when executed by the processor, cause the drone to:
attach, via the docking structure, to the landing structure of the print device; and
deploy a mechanism to decouple the output tray from the print device or retrieve the printed document from the output tray.

32. The print system of claim 26, wherein the transfer request further comprises the location of the user.

33. The print system of claim 26, wherein the transfer request further comprises instructions to cause the drone to retrieve the printed document from the print device within a threshold time of output of the printed document to the output tray.

34. The print system of claim 26, wherein the programming instructions to cause the drone to authenticate the user before allowing the user to access the printed document comprise programming instructions that are configured to, when executed by the processor, cause the drone to wait for receipt of a message that the user was successfully authenticated before allowing the user to access the printed document.

35. The print system of claim 26, wherein the first authentication information comprises at least one of the following: a passcode, a password, biometric information, a barcode, a QR code, or a user identifier.

36. The print system of claim 26, wherein the programming instructions that, when executed by the processor, will cause processor to determine whether the print request will result in the printed document that should be kept confidential comprise programming instructions to cause to processor make the determination based on at least one of the following: user instructions included in the print request, contents of the printed document, or an identity of the user.

37. The print system of claim 26, further comprising programming instructions that, when executed by the processor, will cause processor to, in response to determining that the print request will result in the printed document that should be kept confidential, cause the print device to output the printed document to a secure output tray that is configured to prevent unauthorized access to the printed document.

38. The print system of claim 26, wherein the drone comprises a coupling/decoupling mechanism that is configured to retrieve the printed document from the output tray.

39. A method for secure transfer of printed documents from a print device to a user, the method comprising, by a processor:
receiving a print request from the user,
determining whether the print request will result in a printed document that should be kept confidential,
in response to determining that the print request will result in the printed document that should be kept confidential, generating and transmitting a first authentication information to the user,
causing the print device to execute the print request and output the printed document to an output tray,
transmitting a transfer request to the drone, the transfer request including a user identifier, and
causing a drone to:
determine, using the user identifier, a location of the user,
transfer the printed document from the print device to the user, and
authenticate the user before allowing the user to access the printed document.

40. The method of claim 39, wherein causing the drone to authenticate the user before allowing the user to access the printed document comprises:
transmitting the first authentication information to the drone;
prompting the user to provide a second authentication information to the drone; and
causing the drone to authenticate the user if the first authentication information matches the second authentication information received from the user.

41. The method of claim 40, wherein causing the drone to authenticate the user before allowing the user to access the printed document comprises causing the drone to unlock a holding area configured to hold the print document upon authentication of the user.

42. The method of claim 39, wherein causing the drone to transfer the printed document from the print device to the user comprises causing the drone to:
attach, via a docking structure, to a landing structure of the print device; and
deploy a mechanism to decouple the output tray from the print device or retrieve the printed document from the output tray.

43. The method of claim 39, wherein the transfer request comprises the location of the user.

44. The method of claim 39, wherein the transfer request further comprises instructions to cause the drone to retrieve the printed document from the print device within a threshold time of output of the printed document to the output tray.

45. The method of claim 39, wherein causing the drone to authenticate the user before allowing the user to access the printed document comprises causing the drone to wait for receipt of a message that the user was successfully authenticated before allowing the user to access the printed document.

46. The method of claim 39, wherein the first authentication information comprises at least one of the following: a passcode, a password, biometric information, a barcode, a QR code, or a user identifier.

47. The method of claim 39, wherein determining whether the print request will result in the printed document that should be kept confidential comprises making the determination based on at least one of the following: user instructions included in the print request, contents of the printed document, or an identity of the user.

48. The method of claim 39, further comprising, in response to determining that the print request will result in the printed document that should be kept confidential, causing the print device to output the printed document to a secure output tray that is configured to prevent unauthorized access to the printed document.

49. A print system for secure transfer of printed documents from a print device to a user, the print system comprising:
- a print device comprising an output tray configured to receive documents processed by the print device;
- a drone configured to transfer components from the print device to a user;
- a processor; and
- a computer-readable medium containing programming instructions that, when executed by the processor, will cause processor to:
  - receive a print request from the user,
  - determine whether the print request will result in a printed document that should be kept confidential,
  - in response to determining that the print request will result in the printed document that should be kept confidential, generate and transmit a first authentication information to the user,
  - cause the print device to execute the print request and output the printed document to the output tray,
  - transmit a transfer request to the drone, the transfer request comprising instructions to cause the drone to retrieve the printed document from the print device within a threshold time of output of the printed document to the output tray, and cause the drone to:
    - transfer the printed document from the print device to the user, and
    - authenticate the user before allowing the user to access the printed document.

50. The print system of claim 49, wherein the programming instructions to cause the drone to authenticate the user before allowing the user to access the printed document comprise programming instructions that are configured to, when executed by the processor, cause the processor to:
- transmit the first authentication information to the drone;
- prompt the user to provide a second authentication information to the drone; and
- cause the drone to authenticate the user if the first authentication information matches the second authentication information received from the user.

51. The print system of claim 50, wherein the drone further comprises a locked holding area for holding the printed document during transfer from the print device to the user.

52. The print system of claim 51, wherein the programming instructions to cause the drone to authenticate the user before allowing the user to access the printed document comprise programming instructions that are configured to, when executed by the processor, cause the drone to unlock the holding area upon authentication of the user.

53. The print system of claim 49, wherein the drone comprises a docking structure configured to attach to a landing structure of the print device.

54. The print system of claim 53, wherein the programming instructions to cause the drone to transfer the printed document from the print device to the user comprise programming instructions that are configured to, when executed by the processor, cause the drone to:
- attach, via the docking structure, to the landing structure of the print device; and
- deploy a mechanism to decouple the output tray from the print device or retrieve the printed document from the output tray.

55. The print system of claim 49, wherein the transfer request further comprises the location of the user.

56. The print system of claim 49, wherein the programming instructions to cause the drone to authenticate the user before allowing the user to access the printed document comprise programming instructions that are configured to, when executed by the processor, cause the drone to wait for receipt of a message that the user was successfully authenticated before allowing the user to access the printed document.

57. The print system of claim 49, wherein the first authentication information comprises at least one of the following: a passcode, a password, biometric information, a barcode, a QR code, or a user identifier.

58. The print system of claim 49, wherein the programming instructions that, when executed by the processor, will cause processor to determine whether the print request will result in the printed document that should be kept confidential comprise programming instructions to cause to processor make the determination based on at least one of the following: user instructions included in the print request, contents of the printed document, or an identity of the user.

59. The print system of claim 49, further comprising programming instructions that, when executed by the processor, will cause processor to, in response to determining that the print request will result in the printed document that should be kept confidential, cause the print device to output the printed document to a secure output tray that is configured to prevent unauthorized access to the printed document.

60. The print system of claim 49, wherein the drone comprises a coupling/decoupling mechanism that is configured to retrieve the printed document from the output tray.

61. A method for secure transfer of printed documents from a print device to a user, the method comprising, by a processor:
- receiving a print request from the user,
- determining whether the print request will result in a printed document that should be kept confidential,
- in response to determining that the print request will result in the printed document that should be kept confidential, generating and transmitting a first authentication information to the user,
- causing the print device to execute the print request and output the printed document to an output tray,
- transmitting a transfer request to the drone, the transfer request comprising instructions to cause the drone to retrieve the printed document from the print device within a threshold time of output of the printed document to the output tray, and
- causing a drone to:
  - transfer the printed document from the print device to the user, and
  - authenticate the user before allowing the user to access the printed document.

62. The method of claim 61, wherein causing the drone to authenticate the user before allowing the user to access the printed document comprises:
- transmitting the first authentication information to the drone;
- prompting the user to provide a second authentication information to the drone; and
- causing the drone to authenticate the user if the first authentication information matches the second authentication information received from the user.

63. The method of claim 62, wherein causing the drone to authenticate the user before allowing the user to access the printed document comprises causing the drone to unlock a holding area configured to hold the print document upon authentication of the user.

64. The method of claim 61, wherein causing the drone to transfer the printed document from the print device to the user comprises causing the drone to:
- attach, via a docking structure, to a landing structure of the print device; and
- deploy a mechanism to decouple the output tray from the print device or retrieve the printed document from the output tray.

65. The method of claim 61, wherein the transfer request further comprises the location of the user.

66. The method of claim 61, wherein causing the drone to authenticate the user before allowing the user to access the printed document comprises causing the drone to wait for receipt of a message that the user was successfully authenticated before allowing the user to access the printed document.

67. The method of claim 61, wherein the first authentication information comprises at least one of the following: a passcode, a password, biometric information, a barcode, a QR code, or a user identifier.

68. The method of claim 61, wherein determining whether the print request will result in the printed document that should be kept confidential comprises making the determination based on at least one of the following: user instructions included in the print request, contents of the printed document, or an identity of the user.

69. The method of claim 61, further comprising, in response to determining that the print request will result in the printed document that should be kept confidential, causing the print device to output the printed document to a secure output tray that is configured to prevent unauthorized access to the printed document.

\* \* \* \* \*